US011585358B2

(12) United States Patent
Wilcox

(10) Patent No.: US 11,585,358 B2
(45) Date of Patent: Feb. 21, 2023

(54) ATTACHMENT DEVICE AND RELATED METHODS

(71) Applicant: 3M INNOVATIVE PROPERTIES COMPANY, St. Paul, MN (US)

(72) Inventor: Matthew Kyle Wilcox, Whitestown, IN (US)

(73) Assignee: 3M Innovative Properties Company, St. Paul, MN (US)

(*) Notice: Subject to any disclaimer, the term of this patent is extended or adjusted under 35 U.S.C. 154(b) by 61 days.

(21) Appl. No.: 16/487,164

(22) PCT Filed: Feb. 23, 2018

(86) PCT No.: PCT/US2018/019395
§ 371 (c)(1),
(2) Date: Aug. 20, 2019

(87) PCT Pub. No.: WO2018/160453
PCT Pub. Date: Sep. 7, 2018

(65) Prior Publication Data
US 2020/0056640 A1 Feb. 20, 2020

Related U.S. Application Data

(60) Provisional application No. 62/464,546, filed on Feb. 28, 2017.

(51) Int. Cl.
*F16B 2/22* (2006.01)
*F16B 2/20* (2006.01)
*B60R 13/02* (2006.01)

(52) U.S. Cl.
CPC ............... *F16B 2/22* (2013.01); *F16B 2/20* (2013.01); *B60R 13/0206* (2013.01)

(58) Field of Classification Search
CPC .. F16B 2/20; F16B 5/0635; F16B 2/22; F16B 12/26; F16B 21/06; F16B 37/041;
(Continued)

(56) References Cited

U.S. PATENT DOCUMENTS 2,265,957 A * 12/1941 Tinnerman ............. F16B 5/128
24/295
2,378,258 A * 6/1945 Tinnerman ............ F16B 37/041
411/174
(Continued)

FOREIGN PATENT DOCUMENTS

DE 10021141 A1 * 1/2001 ............. B60R 11/00
DE 19956130 C1 * 3/2001 ............. B60R 19/00
(Continued)

OTHER PUBLICATIONS

International Search Report for PCT International Application No. PCT/US2018/019395, dated Jun. 11, 2018, 5 pages.

*Primary Examiner* — Jonathan Liu
*Assistant Examiner* — Taylor Morris
(74) *Attorney, Agent, or Firm* — Philip P. Soo

(57) ABSTRACT

Provided are attachment devices including a fastener (102) and a clip (104) coupled to the fastener, along with methods related thereof. The clip has first and second members (110, 112) with respective first and second engagement surfaces (116, 118) that oppose each other and define a gap (120) sized to receive a portion of the rail. The clip further includes a bridging member (114) that connects the first and second members to each other. The bridging member can have at least one opening (130) aligned with the gap and providing access for a prying tool to resiliently deflect the first and/or second engagement surface and facilitate detachment of the clip from the rail. Optionally, the bridging member includes (Continued)

a third engagement surface (122) with a configuration that enables a rigid coupling between the clip and the rail.

14 Claims, 7 Drawing Sheets

(58) Field of Classification Search
CPC .... F16B 37/02; F16B 37/044; B60R 13/0206; B60R 13/04; B64C 1/066
See application file for complete search history.

(56) References Cited

U.S. PATENT DOCUMENTS

| | | | | |
|---|---|---|---|---|
| 2,451,591 A * | 10/1948 | Tinnerman | | F16B 5/125 411/508 |
| 2,627,094 A * | 2/1953 | Bedford, Jr. | | F16B 5/0642 24/581.11 |
| 2,798,277 A * | 7/1957 | Laurenceh | | F16B 37/041 411/549 |
| 2,903,815 A * | 9/1959 | Buren, Jr. | | B60R 13/0206 52/511 |
| 2,976,972 A * | 3/1961 | Raymond | | B60J 10/30 52/718.01 |
| 3,131,447 A * | 5/1964 | Tinnerman | | F16L 3/24 248/300 |
| 3,414,035 A * | 12/1968 | Munse | | F16B 37/041 411/175 |
| 3,606,223 A * | 9/1971 | Havener | | H02G 3/126 24/336 |
| 3,720,395 A * | 3/1973 | Schuplin | | H02G 3/126 220/3.9 |
| 3,780,209 A * | 12/1973 | Schuplin | | H02G 3/125 24/336 |
| 3,814,491 A * | 6/1974 | Kackley | | F16B 2/241 403/353 |
| 3,875,661 A * | 4/1975 | Lidstrom | | F16B 37/041 296/191 |
| 4,362,284 A * | 12/1982 | Bolante | | H02G 3/125 403/387 |
| 4,488,844 A * | 12/1984 | Baubles | | F16B 37/045 411/103 |
| 4,517,711 A * | 5/1985 | Tanaka | | F16B 21/086 24/297 |
| 4,609,119 A * | 9/1986 | Richter, Sr. | | H02B 1/048 220/3.5 |
| 4,696,128 A * | 9/1987 | Fukuhara | | B60J 10/265 24/297 |
| 4,714,392 A * | 12/1987 | Muller | | F16B 37/041 411/175 |
| 4,826,375 A * | 5/1989 | Holton | | F16B 37/041 411/174 |
| 4,897,005 A * | 1/1990 | Peterson | | F16B 37/02 411/112 |
| 4,906,155 A * | 3/1990 | Balza | | B64C 1/403 411/485 |
| 4,958,792 A * | 9/1990 | Rinderer | | F16L 3/13 24/457 |
| 5,004,199 A * | 4/1991 | Suk | | H02G 3/125 220/3.9 |
| 5,036,567 A * | 8/1991 | Clinch | | F16B 21/086 24/453 |
| 5,099,549 A * | 3/1992 | Hullmann | | F16B 5/123 24/289 |
| 5,140,741 A * | 8/1992 | Bible | | B25B 7/00 29/278 |
| 5,186,517 A * | 2/1993 | Gilmore | | B60R 11/00 296/214 |
| 5,224,244 A * | 7/1993 | Ikeda | | F16L 3/233 24/16 PB |
| 5,494,245 A * | 2/1996 | Suzuki | | F16L 3/1075 24/487 |
| 5,644,819 A * | 7/1997 | Lyons | | B65D 63/08 24/20 R |
| 5,653,550 A * | 8/1997 | Mutz | | E03C 1/33 403/329 |
| 5,669,522 A * | 9/1997 | Million | | G01G 21/283 177/181 |
| 5,671,513 A * | 9/1997 | Kawahara | | F16B 21/06 24/581.11 |
| 5,692,346 A * | 12/1997 | Irvine | | E04B 9/26 248/320 |
| 5,713,707 A * | 2/1998 | Gagnon | | F16B 37/041 411/112 |
| 5,797,573 A * | 8/1998 | Nasu | | B25B 5/08 248/228.2 |
| 5,826,836 A * | 10/1998 | Gallichan | | B60K 37/04 248/27.3 |
| 5,887,319 A * | 3/1999 | Smith | | F16B 5/0642 24/458 |
| 5,902,007 A * | 5/1999 | Koester | | B60R 13/0206 296/199 |
| 5,931,514 A * | 8/1999 | Chung | | F16B 12/26 292/89 |
| 5,934,019 A * | 8/1999 | Rotharmel | | E05F 15/43 49/28 |
| 6,454,507 B1 * | 9/2002 | Romero Magarino | | B60R 13/0206 411/508 |
| 6,644,713 B2 * | 11/2003 | Del Pozo Abejon | | B60N 3/026 296/146.7 |
| 6,669,150 B2 * | 12/2003 | Benoit | | F16B 21/084 248/71 |
| 6,814,331 B2 * | 11/2004 | Hessling | | B64C 1/066 244/119 |
| 7,086,125 B2 * | 8/2006 | Slobodecki | | B60R 13/0206 24/295 |
| 7,104,594 B2 * | 9/2006 | Granger | | B60R 13/04 24/297 |
| 7,159,926 B2 * | 1/2007 | Ward | | B60R 13/0206 296/146.7 |
| 7,267,361 B2 * | 9/2007 | Hofmann | | B60R 21/213 24/458 |
| 7,640,635 B2 * | 1/2010 | Kim | | B60J 3/0213 24/295 |
| 7,836,565 B2 * | 11/2010 | Ho | | G06F 1/1601 24/528 |
| 8,517,442 B1 * | 8/2013 | Agnew | | B60R 13/0206 52/716.5 |
| 8,540,191 B2 * | 9/2013 | Sabadie | | B64C 1/406 244/131 |
| 8,573,881 B2 * | 11/2013 | Spitz | | F16B 2/243 403/397 |
| 8,616,516 B2 * | 12/2013 | Rittner | | B64C 1/403 248/500 |
| 8,622,348 B2 * | 1/2014 | Sabadie | | B64C 1/406 244/131 |
| 8,627,552 B2 * | 1/2014 | Smith | | F16B 5/0657 24/295 |
| 8,648,264 B2 * | 2/2014 | Masumoto | | H02G 3/081 174/520 |
| 8,701,260 B1 * | 4/2014 | Jacobsen | | B64C 1/066 29/426.6 |
| 9,021,667 B2 * | 5/2015 | Wasco | | A47C 7/62 24/462 |
| 9,080,588 B2 * | 7/2015 | Diez Herrera | | F16B 21/075 |
| 9,267,529 B2 * | 2/2016 | Tejero Salinero | | F16B 37/02 |
| 9,291,180 B2 * | 3/2016 | Nakazato | | F16B 2/20 |
| D762,456 S * | 8/2016 | Lo | | H02G 3/125 D8/349 |
| 10,087,973 B2 * | 10/2018 | Wilusz | | F16B 37/043 |
| 10,855,000 B1 * | 12/2020 | Randolph | | H01R 4/28 |
| 11,085,476 B2 * | 8/2021 | Walz | | F16B 12/26 |
| 2001/0046426 A1 * | 11/2001 | Lubera | | F16B 5/065 411/182 |
| 2003/0071475 A1 * | 4/2003 | Abejon | | F16B 5/065 296/39.1 |

(56) References Cited

U.S. PATENT DOCUMENTS

| | | | |
|---|---|---|---|
| 2003/0192843 A1* | 10/2003 | Winig | A47B 96/067 |
| | | | 211/87.01 |
| 2003/0209632 A1 | 11/2003 | Hessling | |
| 2004/0049894 A1* | 3/2004 | Jackson, Jr. | F16B 21/076 |
| | | | 24/293 |
| 2005/0006927 A1 | 1/2005 | Granger | |
| 2007/0050955 A1* | 3/2007 | Hansen | F16B 5/0614 |
| | | | 24/297 |
| 2007/0253796 A1* | 11/2007 | Kawai | F16B 5/0642 |
| | | | 411/508 |
| 2009/0003961 A1* | 1/2009 | Benkel | F16B 37/02 |
| | | | 411/190 |
| 2009/0049660 A1* | 2/2009 | Babian | F16B 2/20 |
| | | | 24/455 |
| 2009/0205174 A1* | 8/2009 | Slobodecki | F16B 21/09 |
| | | | 24/458 |
| 2010/0219313 A1* | 9/2010 | Ogino | B60R 13/0206 |
| | | | 248/231.81 |
| 2011/0318089 A1* | 12/2011 | Peng | F16B 5/0635 |
| | | | 403/9 |
| 2012/0192925 A1* | 8/2012 | Grushkowitz | F16L 3/24 |
| | | | 136/251 |
| 2012/0274094 A1* | 11/2012 | Mazur | F16B 5/0635 |
| | | | 296/146.7 |
| 2013/0026788 A1* | 1/2013 | Kuhm | F16B 37/043 |
| | | | 296/191 |
| 2014/0027392 A1* | 1/2014 | Crippen | H05K 7/1488 |
| | | | 211/26 |
| 2015/0033511 A1* | 2/2015 | Nakazato | F16B 2/20 |
| | | | 24/351 |
| 2015/0143673 A1 | 5/2015 | Biadatz | |
| 2015/0188381 A1* | 7/2015 | Vohlgemuth | H02K 11/30 |
| | | | 310/71 |
| 2015/0211556 A1* | 7/2015 | Alexander | F16B 2/20 |
| | | | 114/361 |
| 2016/0079909 A1* | 3/2016 | Franklin | F24S 25/632 |
| | | | 211/41.1 |
| 2016/0114740 A1* | 4/2016 | Kwon | B60Q 3/51 |
| | | | 248/27.3 |
| 2016/0348708 A1* | 12/2016 | Lo | F16B 21/086 |
| 2017/0122349 A1* | 5/2017 | Martin | B21D 53/36 |
| 2017/0167523 A1* | 6/2017 | Davis | F16B 37/044 |
| 2017/0268559 A1* | 9/2017 | Wilusz | F16B 37/043 |
| 2018/0099624 A1* | 4/2018 | Li | F16B 5/0657 |
| 2019/0248303 A1* | 8/2019 | Kosidlo | B60J 10/36 |
| 2019/0383318 A1* | 12/2019 | Buczynski | B60R 13/0206 |
| 2020/0124078 A1* | 4/2020 | Bruck | F16B 37/043 |
| 2020/0346587 A1* | 11/2020 | Guggenheim | A61L 9/12 |
| 2023/0003239 * | 1/2023 | Chung | H04M 1/0252 |

FOREIGN PATENT DOCUMENTS

| | | | |
|---|---|---|---|
| EP | 3361628 A1 * | 8/2018 | F16B 2/22 |
| GB | 2602955 A * | 7/2022 | F16B 2/243 |
| JP | 2016-120738 | 7/2016 | |

* cited by examiner

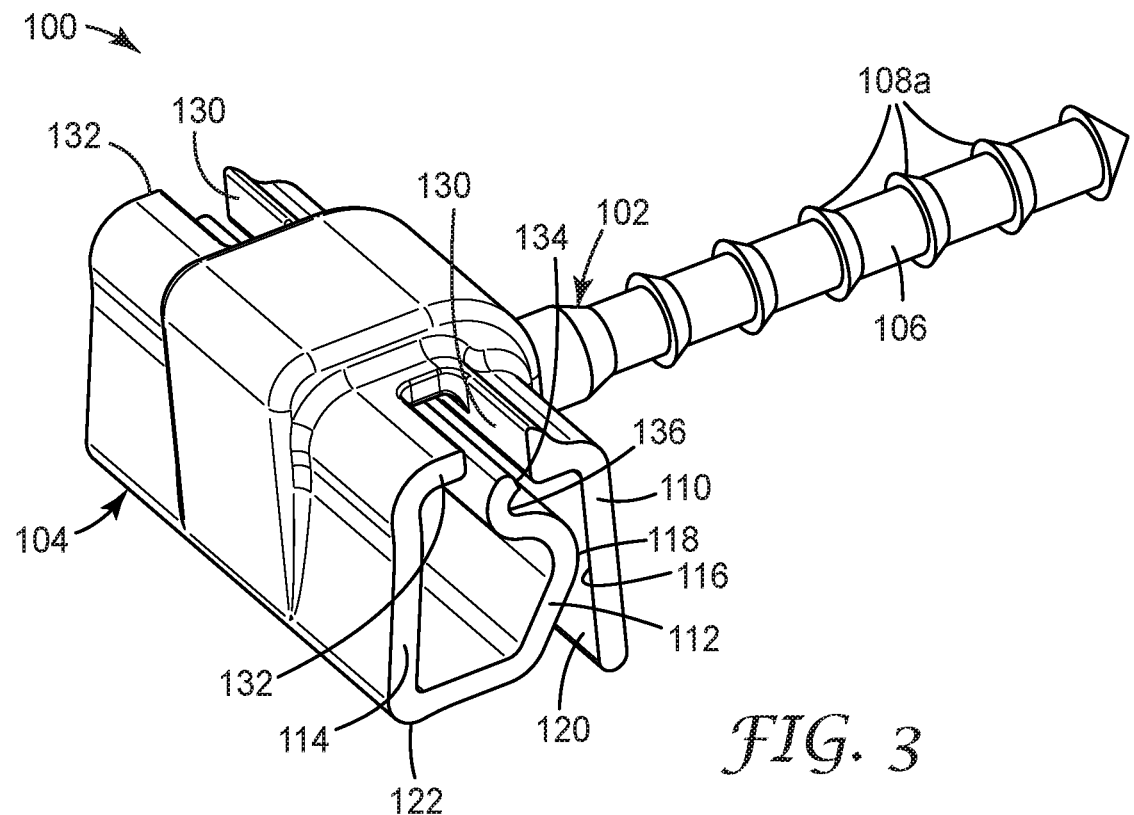
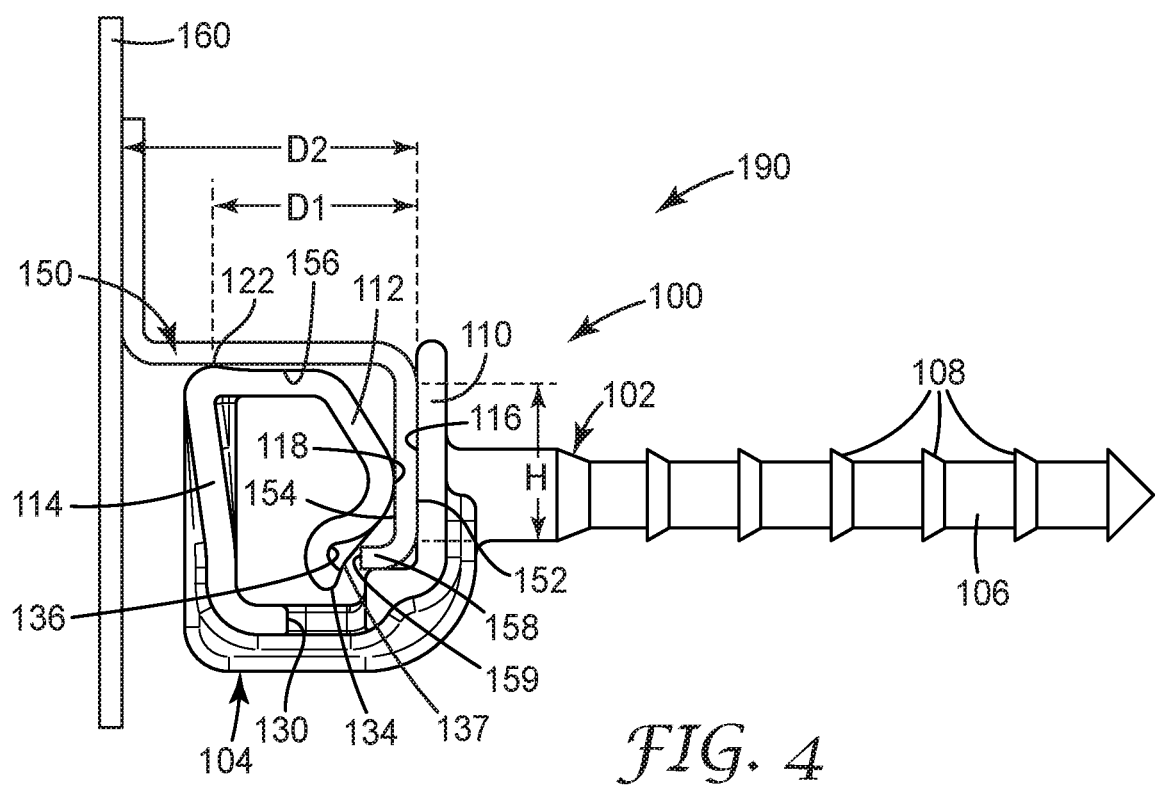

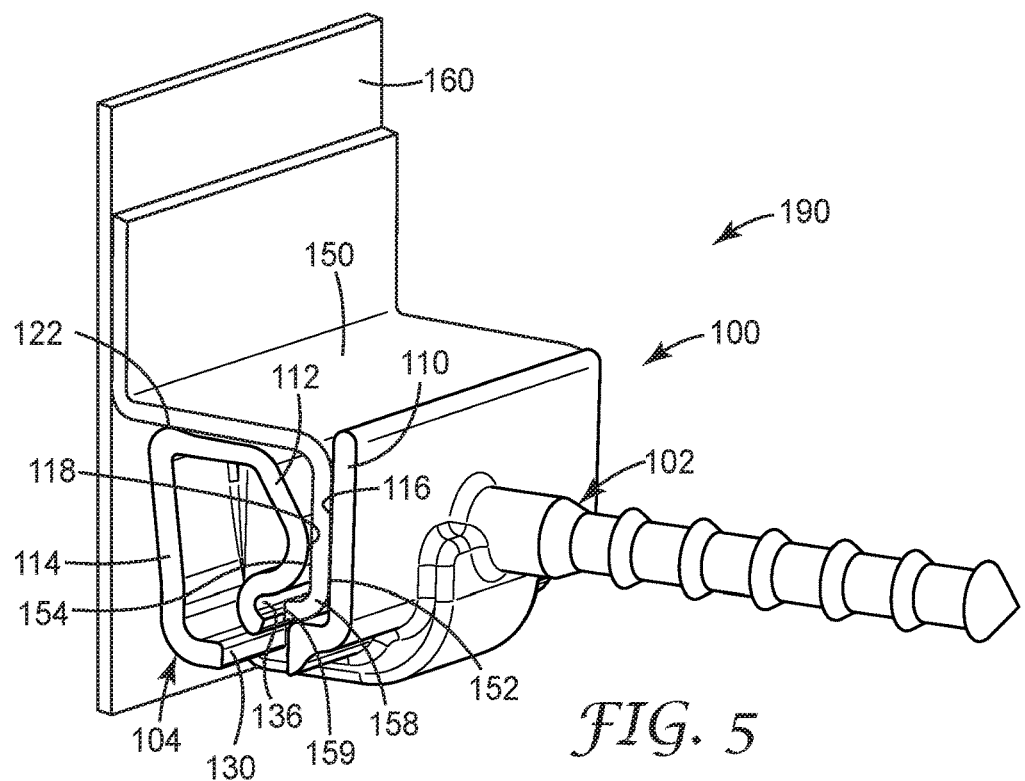
FIG. 5
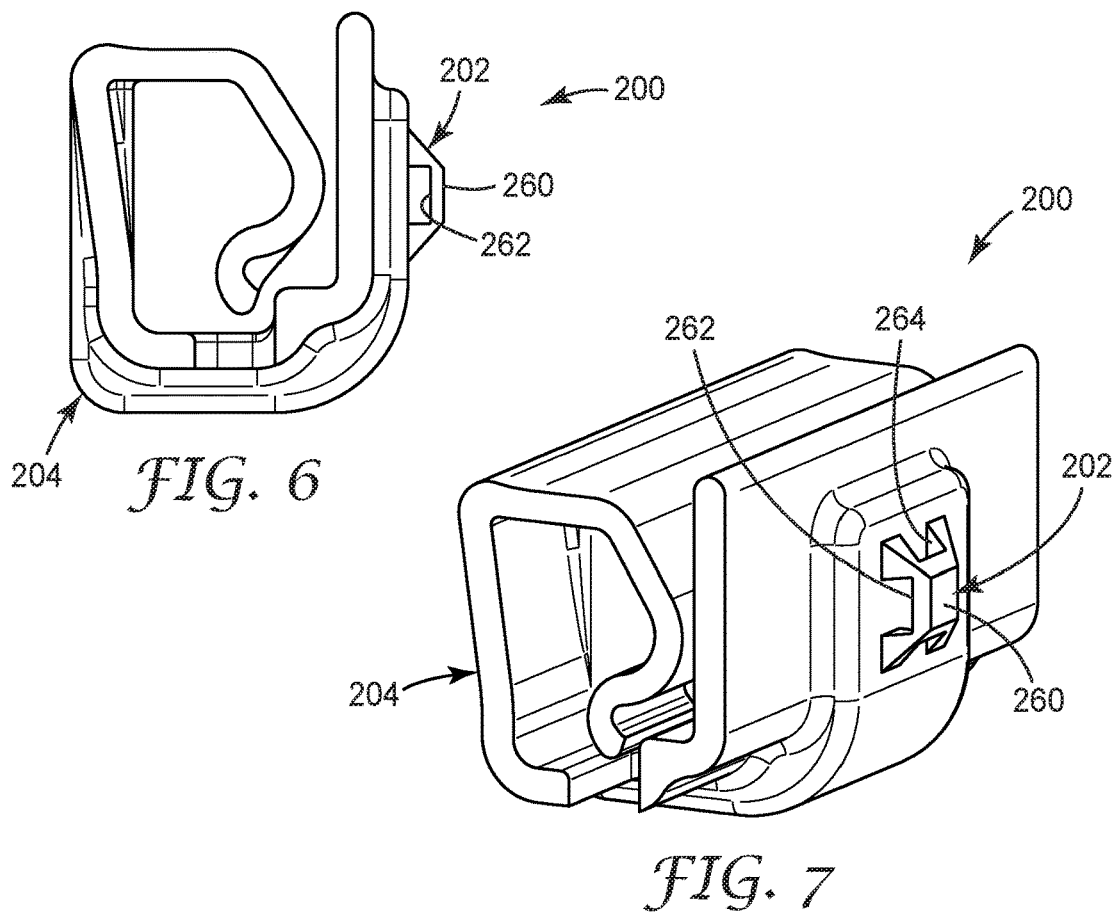
FIG. 6
FIG. 7

ATTACHMENT DEVICE AND RELATED METHODS

CROSS REFERENCE TO RELATED APPLICATIONS

This application is a national stage filing under 35 U.S.C. 371 of PCT/US2018/019395, filed Feb. 23, 2018, which claims the benefit of U.S. Provisional Patent Application No. 62/464,546, filed Feb. 28, 2017, the disclosures of which are incorporated by reference in their entirety herein.

FIELD OF THE INVENTION

Described herein are attachment devices that mechanically couple to external structures and related methods thereof. The described attachment devices can be useful in coupling to, for example, automotive and aerospace structures.

BACKGROUND

The marketplace is replete with diverse commercial and industrial solutions intended to fasten articles to structural elements. Such solutions can range from consumer products that serve routine household needs to high performance couplings used in manufacturing complex, multi-component devices. Technical markets served by such products can include architectural products, industrial transportation, energy and electronic markets, consumer products, health care, and many others.

In devising such a solution, it is common for form to follow function. Simple adhesive-backed fasteners can be adequate in many cases. Some applications demand temporary fasteners that can be easily removed after being attached. Some applications further require that the fastener be not only removable but also repositionable on the structure to which it is coupled. It can be further desirable for these fasteners to securely couple to, and detach from, a given structure, yet avoid causing damage to the anchoring structure or leaving adhesive remnant upon removal.

One fastener currently used in the aerospace industry attaches to stringers (or longerons), which are rail-like structures that traverse the exterior structure of aircraft fuselage. These stringers are part of the structural frame of the aircraft and are bonded to the inboard side of the aircraft skin. It is common for stringers to be used for securing interior components of the fuselage, including interior walls, thermal and acoustic insulation, heating and ventilation ducts, and electrical wiring.

Stringers come in many different cross-sectional configurations. Some may have a generally "U"-shaped cross-section, some may have an "L"-shaped cross-section, or other combinations of shapes and features based on the structural needs of the aircraft. Each presents its own unique set of technical challenges in regards to providing a convenient, yet secure, attachment for the fastening device.

SUMMARY

When attaching articles to aircraft stringers, it is common to use a basic attachment device consisting of a fastener backed with a pressure-sensitive adhesive ("PSA"). The PSA can attach directly to an exposed area of the aircraft skin. This requires the area to be unobstructed and a clean surface area to which the device will be adhered. Once adhered, the fasteners are not intended to be removable. As such, they must be scraped off and thrown away if misplaced.

As an alternative, a fastener can be coupled to a clip that releasably attaches to the stringer. Most of these clips, however, are not intended for coupling to stringers with a generally "L"-shaped cross-section. Those that are capable of coupling to such stringers face difficulties in achieving a rigid coupling. For example, these clips can spontaneously dislodge from the rail when twisted about the longitudinal axis of the rail. Intentional disengagement of the clip from the rail can also present a technical challenge, since the body of the clip itself can block access to the prongs of the clip that engage the rail.

The provided attachment devices overcome the technical problems above by providing an interference fit with the rail while providing access to the locking portions of the clip to facilitate disengagement upon demand. Being mounted to the stringer (as opposed to adhering to the skin) allows for a flexible installation that is less affected by obstructions and is not dependent on a clean application surface. These new attachments are made of a plastic such as nylon with no metal components, thus avoiding risks of galvanic corrosion.

Advantageously, the attachment device can include an integrated barbed spike to pierce and hold thermal/acoustic materials to the aircraft structure. Alternatively, the barbed spike can be substituted with any of a number of other alternative fastening mechanisms such as a mounting post, loop holder, or cable tie anchor.

In a first aspect, an attachment device for a rail is provided. The attachment device comprises: a fastener; a clip coupled to the fastener, the clip comprising: first and second members having respective first and second engagement surfaces that oppose each other and define a gap sized to receive a portion of the rail; and a bridging member connecting the first and second members to each other, the bridging member having at least one opening aligned with the gap and providing access for a prying tool to resiliently deflect the first and/or second engagement surface and facilitate detachment of the clip from the rail.

In a second aspect, an attachment device for a rail is provided, comprising: a fastener; a clip coupled to the fastener, the clip comprising: first and second members having respective first and second engagement surfaces that oppose each other and define a gap sized to receive a portion of the rail, the first engagement surface being generally planar and having an overall height H, defined perpendicular to the longitudinal axis of the gap; and a bridging member connecting the first and second members to each other, the bridging member having a third engagement surface orthogonal to the first engagement surface, wherein the third engagement surface extends a distance D from the plane of the first engagement surface, and ratio D/H is in the range of from 0.7 to 2.

In a third aspect, an attachment device for a rail is provided, comprising: a fastener; a clip coupled to the fastener, the clip comprising: first and second members having respective first and second engagement surfaces that oppose each other and define a gap sized to receive a portion of the rail, the second engagement surface including a longitudinal cavity shaped to receive a tip of a prying tool; and a bridging member connecting the first and second members to each other.

In a fourth aspect, a coupled assembly is provided, comprising an aforementioned attachment device and the rail mechanically retained in the attachment device.

In a fifth aspect, a method of coupling an aforementioned attachment device to the rail is provided, comprising: aligning an edge of the rail with the gap; and urging the edge of the rail into the gap until the first and second members mutually engage opposing sides of the rail to mechanically retain the portion of the rail within the gap.

In a sixth aspect, a method of releasing an aforementioned attachment device from the rail is provided, the method comprising: inserting a prying tool through the opening; applying a force against the first or second member to resiliently deflect the first and/or second member apart from each other; and slidably removing the portion of the rail through the widened gap.

In a seventh aspect, a method of releasing an attachment device from a rail is provided, wherein the attachment device comprises a clip having first and second members engaged to opposing surfaces of the rail and a bridging member connecting the first and second members to each other. The method comprises: inserting a prying tool through an opening in the bridging member to access the first or second member; with the prying tool, resiliently deflecting the first and/or second member apart from each other; and slidably disengaging the rail from the first and second members.

BRIEF DESCRIPTION OF THE DRAWINGS

FIG. 3 is an isometric view of the attachment device of FIGS. 1-2, showing its bottom, rear, and side surfaces;

FIG. 4 is an elevational side view of an assembly showing the attachment device of FIGS. 1-3 coupled to a rail;

FIG. 5 is an isometric view of the assembly of FIG. 4, showing its front, top, and side surfaces;

FIGS. 6-7 are side and isometric views of an attachment device according to another exemplary embodiment;

DEFINITIONS

Figure 1:
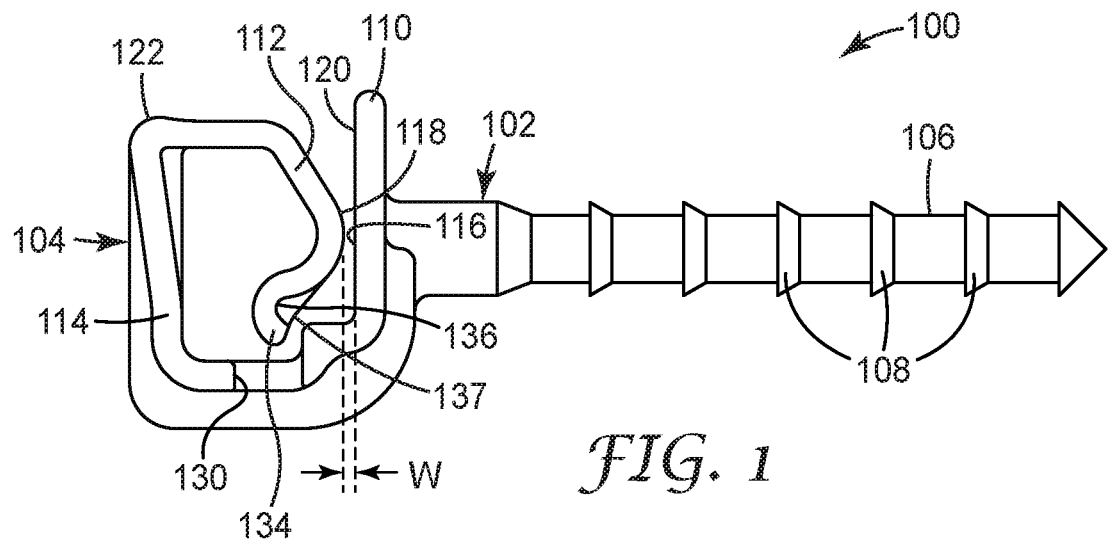
FIG. 1 is an elevational side view of an attachment device according to one exemplary embodiment.

As used herein:

"distance" means the shortest length of space between two objects or locations specified thereon;

"orthogonal" means at right angles to; and

"transverse" means along a horizontal direction with respect to a given article.

DETAILED DESCRIPTION

Repeated use of reference characters in the specification and drawings is intended to represent the same or analogous features or elements of the disclosure. Such features and elements are described using language that reflects the orientation of the articles depicted in the drawings with the understanding that other orientations could be used, depending on the application. When describing movement of a body, it is to be understood that the frame of reference for such movement could be based on either the body or its surrounding structure.

Numerous other modifications and embodiments can be devised by those skilled in the art, which fall within the scope and spirit of the principles of the disclosure. The figures may not be drawn to scale.

Embodiments of releasable and repositionable attachment devices and manners of their use shall now be described by way of illustration and example. While certain embodiments are described for the purpose of securement of items to aircraft structures, these are not intended to be limiting. The depicted shapes and sizes of particularly named structures may vary, even significantly, from what is exemplified and yet perform the same or equivalent function. Absent express notice to the contrary, the provided devices and related methods need not be used exclusively with aircraft stringers or even aerospace applications in general.

Figure 2:
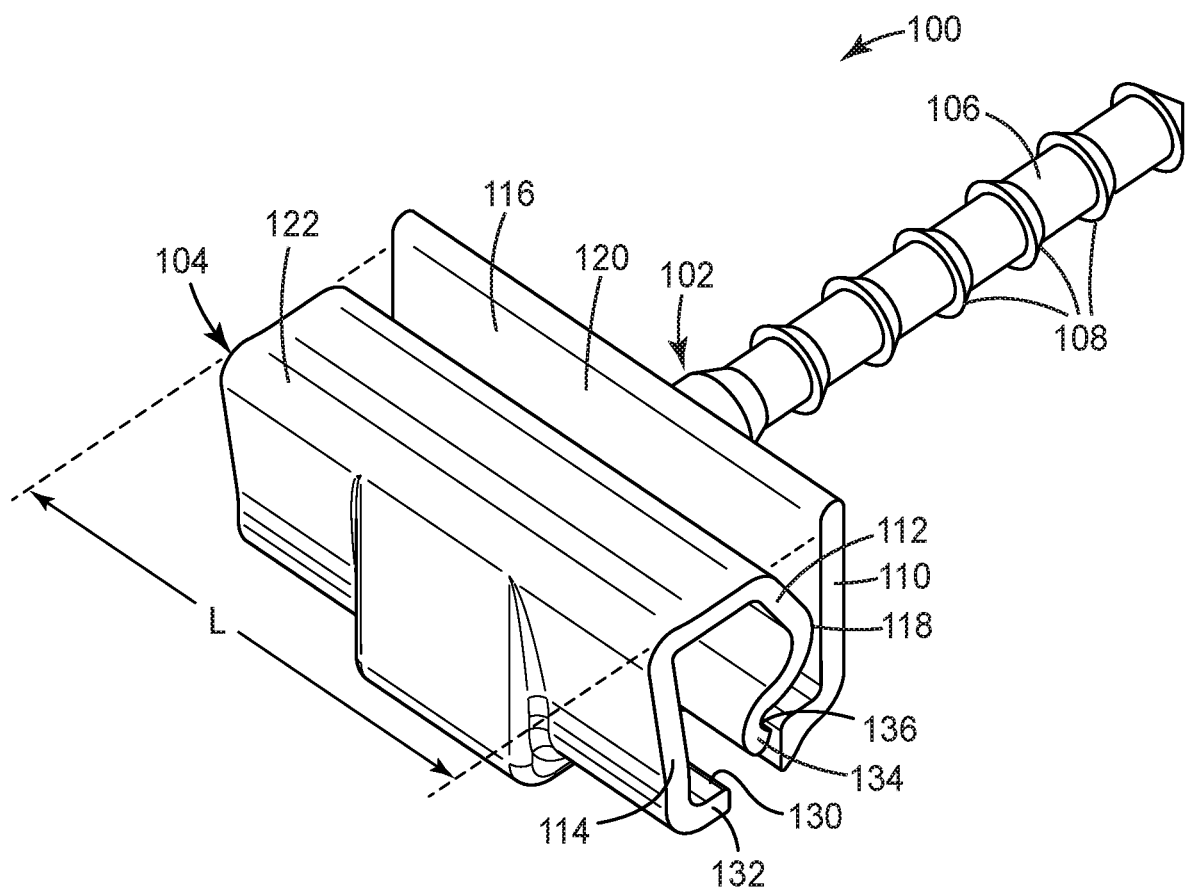
FIG. 2 is an isometric view of the attachment device of FIG. 1, showing its top, rear, and side surfaces.

An exemplary attachment device is illustrated in FIGS. 1-3 and designated by the numeral 100. The device 100 includes a fastener 102 and a clip 104 coupled to the fastener 102.

The structure of the fastener 102 is not particularly restricted. In the depicted embodiment, the fastener 102 is a spike 106 with a plurality of locking barbs 108. The spike 106 has a configuration that allows the fastener 102 of the attachment device 100 to partially or fully pierce, for example, an insulation blanket. Once the spike 106 has penetrated the blanket, the locking barbs 108 can abut against the outward-facing surfaces of the blanket or complemental retaining member that mechanically secures the blanket to the fastener 102. Such a retaining member could be, for example, a plastic disc with a slotted hole, positioned on the opposing side of the blanket from the clip 104.

The clip 104 includes a first member 110, a second member 112, and a bridging member 114 connecting the first member 110 and second member 112 to each other. In this embodiment, the first member 110, bridging member 114, and second member 112 are arranged in a bi-folded, overlapping relation whereby the second member 112 is disposed between the first member 110 and the bridging member 114 as viewed from a transverse direction. The first and second members 110, 112 have respective first and second engagement surfaces 116, 118 that oppose each other. The first and second engagement surfaces 116, 118 collectively define a gap 120 for receiving a portion of a rail (shown in FIG. 4) when the clip 104 is engaged to the rail 150.

The bridging member 114 further includes a third engagement surface 122 presented on an outward-facing surface of the clip 104. As shown here, the third engagement surface 122 can be generally planar. In configurations used with "L"-shaped rails, and as shown here, at least a portion of the third engagement surface 122 can be generally orthogonal to the planar first engagement surface 116, such that the first member 110 and bridging member 114 can flatly engage respective orthogonal inner surfaces of the rail. It is understood that the third engagement surface 122 can have alternative orientations depending on the cross-sectional shape of the rail with which it is to be coupled.

Optionally and as shown, the first engagement surface 116 is generally planar. Optionally and as shown, the second engagement surface 118 has at least portions that are non-planar. In FIG. 1, the second engagement surface 118 displays a convex contour as viewed from a transverse direction. As a further option, one or both of the first and second engagement surfaces 116, 118 can be planar, and portions of the first and second engagement surfaces 116, 118, or tangent planes thereof, can be generally parallel with each other.

The gap 120 between the first and second engagement surfaces 116, 118 can have a generally uniform width or a variable width as shown in FIG. 1. At its narrowest point, the gap 120 can have a width that is approximately the thickness of the portion of the rail to be received in the gap 120. In some embodiments, the gap can be narrower than the rail thickness such that a compressive force is applied to the rail when it is received in the clip 104 (as shown, e.g., in FIG. 4).

The gap 120 has a length "L" (defined along the longitudinal axis of the elongated gap 120) and a width "W", which is defined at its narrowest point. For most commonly sized rails, W can be in the range of from 0 mm to 5 mm, 0.2 mm to 4 mm, 0.4 mm to 3 mm, or in some embodiments, less than, equal to, or greater than 0.1 mm, 0.2, 0.3, 0.4, 0.5, 0.6, 0.7, 0.8, 0.9, 1, 1.2, 1.4, 1.6, 1.8, 2, 2.5, 3, 3.5, 4, 4.5, or 5 mm. The width W can be in the range of from 0% to 100%, 20% to 80%, or 30% to 70% of the rail thickness, or in some embodiments, less than, equal to, or greater than 1%, 2, 5, 10, 20, 30, 40, 50, 60, 70, 80, 90, 95, 98, or 100% of the rail thickness.

Referring now to FIG. 2, the gap 120 between the first and second engagement surfaces 116, 118 is elongated by virtue of the clip 104 being enlarged along its transverse dimension (parallel to the rail when engaged) relative to its height or depth dimensions. The gap 120, at its narrowest point, can have an aspect ratio (i.e., L:W) of from of 100:1 to 10:1, from 80:1 to 20:1, from 60:1 to 30:1, or in some embodiments, less than, equal to, or greater than 100:1, 95:1, 90:1, 85:1, 80:1, 75:1, 70:1, 65:1, 60:1, 55:1, 50:1, 45:1, 40:1, 35:1, 30:1, 25:1, 20:1, 15:1, or 10:1.

FIG. 3, which shows the bottom side of the attachment device 100, reveals a pair of symmetrically disposed openings 130, or "cutouts," in the bridging member 114. Each opening 130 has an elongated shape and extends inwardly from a lateral edge 132 of the bridging member 114 along a transverse direction. In FIG. 3, the openings 130 have the shape of an elongated rectangle, but other shapes are also possible. Each opening 130 is generally aligned with the gap 120 between the first and second engagement surfaces 116, 118 and is sized sufficiently large for the tip of a prying tool to be inserted therein.

The specific size, shape and location of the openings 130 is not particularly limited. In an alternative embodiment, for example, a single opening could be used. The single opening could optionally be centered between the lateral edges of the clip. If spaced away from the lateral edges of the clip, the opening or openings would be fully enclosed within the bridging member 114. If the clip is made using a molding process, then fully surrounded openings could be formed using a subsequent manufacturing step.

Advantageously, the openings 130 facilitate the operation of the clip 104 by allowing access to a distal end 134 of the second member 112. As will be described in more detail later, a flat distal end of a prying tool can be inserted through one or both openings 130, enabling a user to apply a force against the distal end 134 of the second member 112 and widen the gap 120 by resiliently deflecting the first and second members 110, 112 apart from each other. This operation can be further assisted by longitudinal cavities 136 located on the distal end 134 of the second member 112, which are shaped to accommodate the pointed tip of such a prying tool.

The benefits of this configuration become more apparent when viewed in the context of the coupled assembly 190 shown in FIGS. 4 and 5, where the attachment device 100 is releasably attached to an exemplary "L"-shaped rail 150 attached to a wall 160. While not intended to be limiting, the rail 150 and wall 160 can be a structural elements on the walls of an aircraft (e.g., the stringer rail and skin of the aircraft, respectively), commercial vehicle, or building.

The configuration shown in FIG. 4 can be obtained by positioning the attachment device 100 such that an edge of the rail 150 is aligned with the entrance to the gap 120. The edge of the rail 150 can then be urged into the gap 120 until the first and second members 110, 112 mutually engage opposing sides of the rail to mechanically retain a portion of the rail 150 within the gap 120.

In this configuration, the first engagement surface 116 flatly engages a front-facing side 152 of the rail 150, the second engagement surface 118 engages a rear-facing side 154 of the rail 150, and the third engagement surface 122 engages a bottom-facing side 156 of the rail 150. In the depicted embodiment, the front-facing side 152 and rear-facing side 154 of the rail are parallel to each other, although this is not critical.

By simultaneously engaging three distinct sides 152, 154, 156 of the rail 150, the clip 104 can achieve a rigid coupling with the rail 150. Preferably, the rigid coupling resists sliding and rotational movement even when an operative load is applied to the fastener 102.

In some embodiments, the attachment device 100 is rigidly coupled to the rail 150 along 5 out of 6 degrees of freedom. As one degree of freedom, the attachment device 100 may be configured to slide longitudinally along the length of the rail 150. Alternatively, the clip 104 can have a configuration that provides sufficient friction with the rail 150 whereby the attachment device 100 is essentially immobilized relative to the rail 150 along all 6 degrees of freedom. Friction can be enhanced, if desired, by disposing a material, such as a rubbery material, or a texture onto one or more of the engagement surfaces 116, 118, 122 to resist sliding motion relative to the rail 150.

As further shown in FIGS. 4 and 5, the rail 150 further includes a return flange 158 orthogonal to both the front-facing side 152 and rear-facing side 154 of the rail 150, as viewed from a transverse direction. When the clip 104 is coupled to the rail 150, a distal end 159 of the return flange 158 contacts portion 137 of the second engagement surface 118. By contacting two discrete locations along the rail 150—the return flange 158 and the rear-facing side 154—the configuration of the second engagement surface 118 increases resistance to relative rotational movement between the clip 104 and the rail 150.

Referring again to FIG. 4, the first engagement surface 116 has an overall height "H," defined perpendicular to a longitudinal axis of the gap as shown. The third engagement surface 122 extends a distance "D1" from the plane of the first engagement surface 116 as shown. Advantageously, D1 can be large relative to the cross-sectional dimensions of the rail, thereby enabling a strong countervailing moment when a twisting force is applied to the clip 104 that would otherwise disengage the clip 104 from the rail 150 (based on a clockwise rotation of the attachment device 100 in FIG. 4). FIG. 4 also refers to distance "D2," which is the maximum value of D1 and defined between the plane of the first engagement surface 116 and the wall 160.

The ratio D1/H can be in the range of from 0.7 to 2, 0.9 to 1.8, 1 to 1.5, or in some embodiments, less than, equal to, or greater than 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, or 1.5. The ratio D1/D2 can be in the range of from 0.5 to 1, 0.6 to 1, 0.7 to 1, or in some embodiments, less than, equal to, or greater than 0.5, 0.55, 0.6, 0.65, 0.7, 0.75, 0.8, 0.85, 0.9, or 0.95, or less than or equal to 1.

Optionally and as shown, the third engagement surface 122 of the bridging member 114 makes contact with a corresponding inner surface of the rail. In this particular embodiment, contact between the bridging member 114 and the rail 150 occurs along a slightly protruding corner of the bridging member 114 in FIG. 4. This third engagement surface 122 protrudes to help ensure the point of contact occurs at the corner, as shown, even if the bridging member were flexed to some degree in use. In so doing, D1, D1/H, and D1/D2 can be maximized to the extent possible, or practical, given the shape and overall dimensions of the clip 104.

Here, line contact between the bridging member 114 and the rail 150 defines approximately a singular value of D1 as shown in FIG. 4. In an alternative embodiment, planar contact may be preferred, in which the bridging member flatly engages the rail. In such an instance, D1, D1/H, and D1/D2 could each encompass a range of values.

Figure 4A:
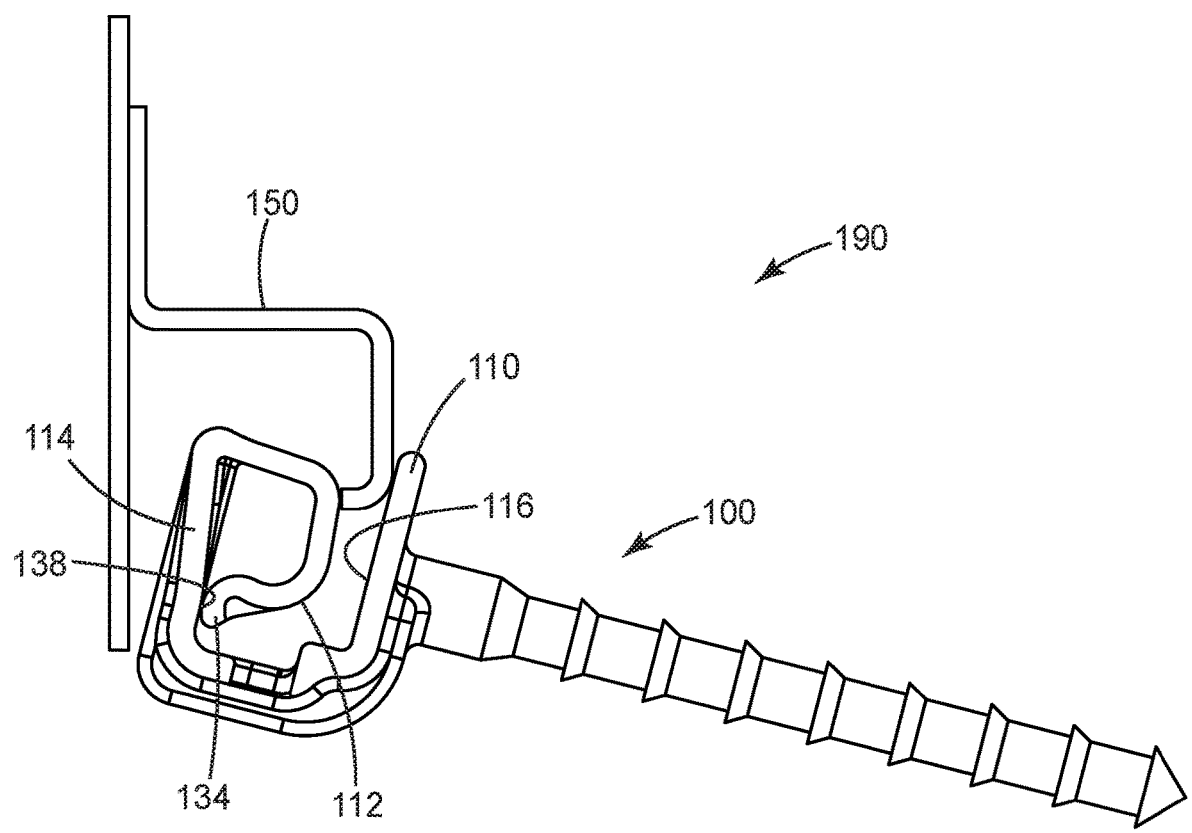
FIG. 4A is an elevational side view of the assembly of FIG. 4 showing the attachment device in the process of being coupled to, or de-coupled from, the rail.

FIG. 4A shows the attachment device 100 in the process of being attached to, or alternatively removed from, the rail 150. As shown, the distal ends 134 of the second member 112 are being deflected away from the plane of the first engagement surface 116 toward an inner surface 138 of the bridging member 114. Optionally and as shown, the second member 112 makes contact with the inner surface 138. In this fully opened configuration, there is just enough space between the distal ends 134 of the second member 112 and the first engagement surface 116 of the first member 110 to allow for entry and egress of the return flange 158, as shown in FIG. 4A.

The attachment device 100 can be made as a single unitary construction to avoid the time and expense of assembling parts. In one embodiment, the fastener 102 and clip 104 are integrally molded from an engineering polymer using an injection molding process. Preferably, the polymer used for the attachment device 100 is rigid enough to securely anchor an article to the rail 150, but also have sufficient flexibility to allow the clip 104 to be snapped on and off the rail 150 without difficulty and without part failure.

Polymers useful for making the attachment devices described herein include polystyrene, polypropylene, polyethylene, acrylonitrile butadiene styrene, nylon, polyamide, polybutylene terephthalate, polycarbonate, polyoxymethylene, polyethylene terephthalate, polyphenylene sulfide, polyphenylene oxide, polysulphone, polytetrafluoroethylene, along with mixtures and copolymers thereof. In one preferred embodiment, the attachment device 100 is injection molded from nylon 6,6. Alternatively or in combination, metal, ceramic and/or composite materials may also be used in components of the attachment device depending on the application at hand.

FIGS. 6-11 show other attachment devices with clips structurally analogous to clip 104 but using different fastening mechanisms. Fastener mechanisms are merely illustrative and any number of variants are possible. Particular options and advantages associated with the clip portion of the attachment device will not be repeated in the descriptions of these figures below.

FIGS. 6-7 show an attachment device 200 having a lug fastener 202 integrally coupled to a clip 204. While the clip 204 functions similarly to clip 104 of attachment device 100, the lug fastener 202 differs from fastener 102 in that it has a lug body 260 with intersecting apertures 262, 264 for tying in one or more peripheral articles. The apertures 262, 264 can have, as illustrated, rectangular cross-sections and intersect each other at right angles such that the ties can be threaded through the lug body 260 either horizontally or vertically.

Figure 8:
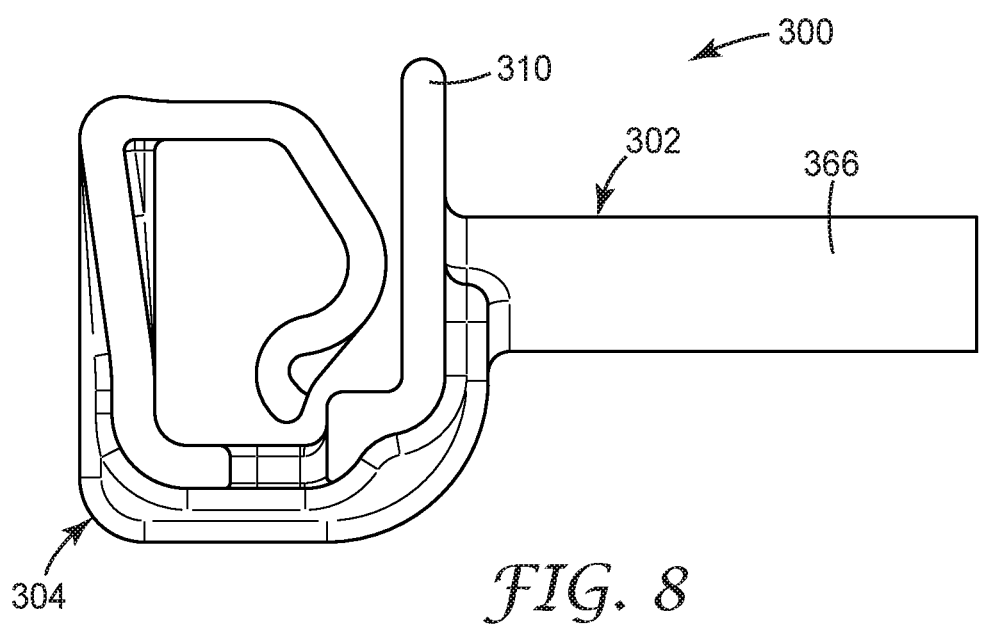
FIGS. 8-9 are side and isometric views of an attachment device according to still another exemplary embodiment.
Figure 9:
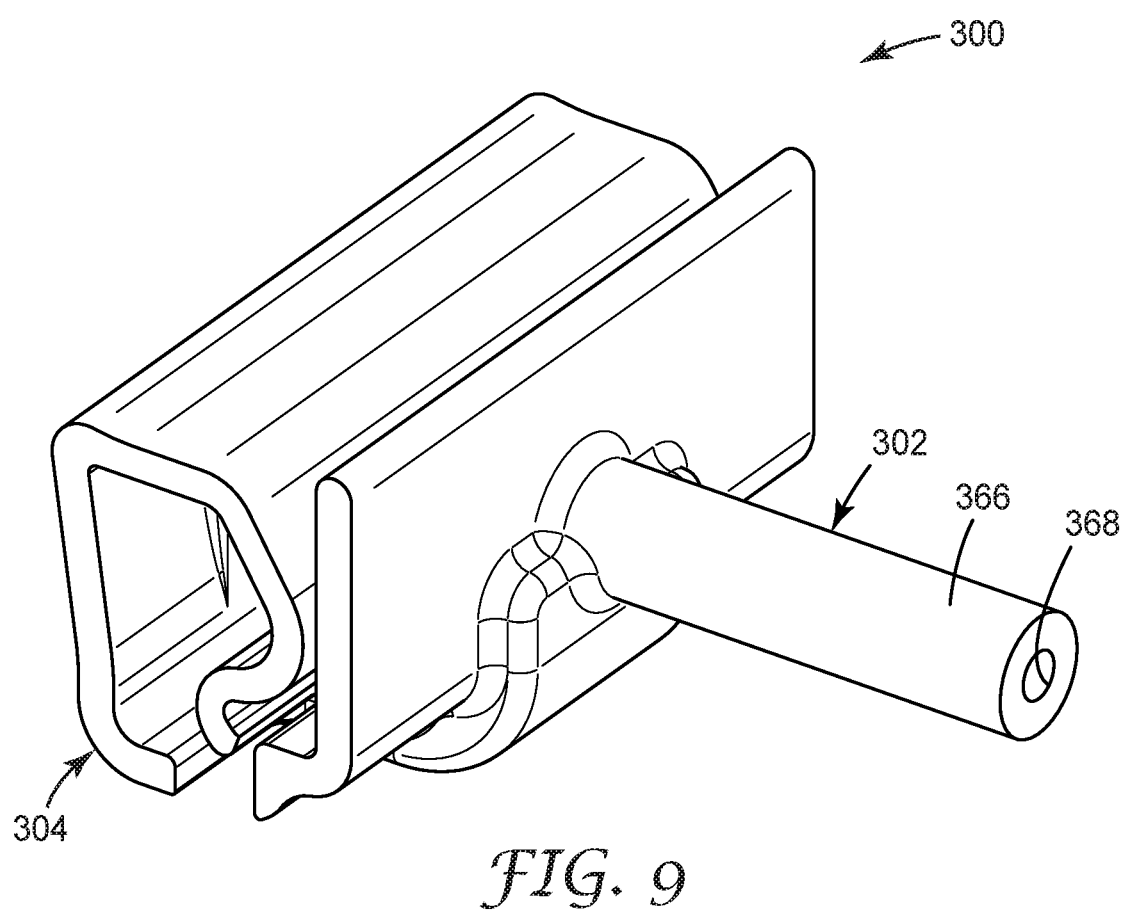

FIGS. 8-9 show another attachment device 300 having a post fastener 302 integrally coupled to a clip 304. Here, the post fastener 302 includes a body 366 extending outwardly along a direction perpendicular to a first member 310 of the clip 304. Within the body 366 is a longitudinally-aligned aperture 368 to accommodate a screw (not shown) for attaching peripheral articles. The inner surfaces of the aperture 368 can optionally be threaded. The body 366 is cylindrical as depicted here, but other shapes could also be used.

Figure 10:
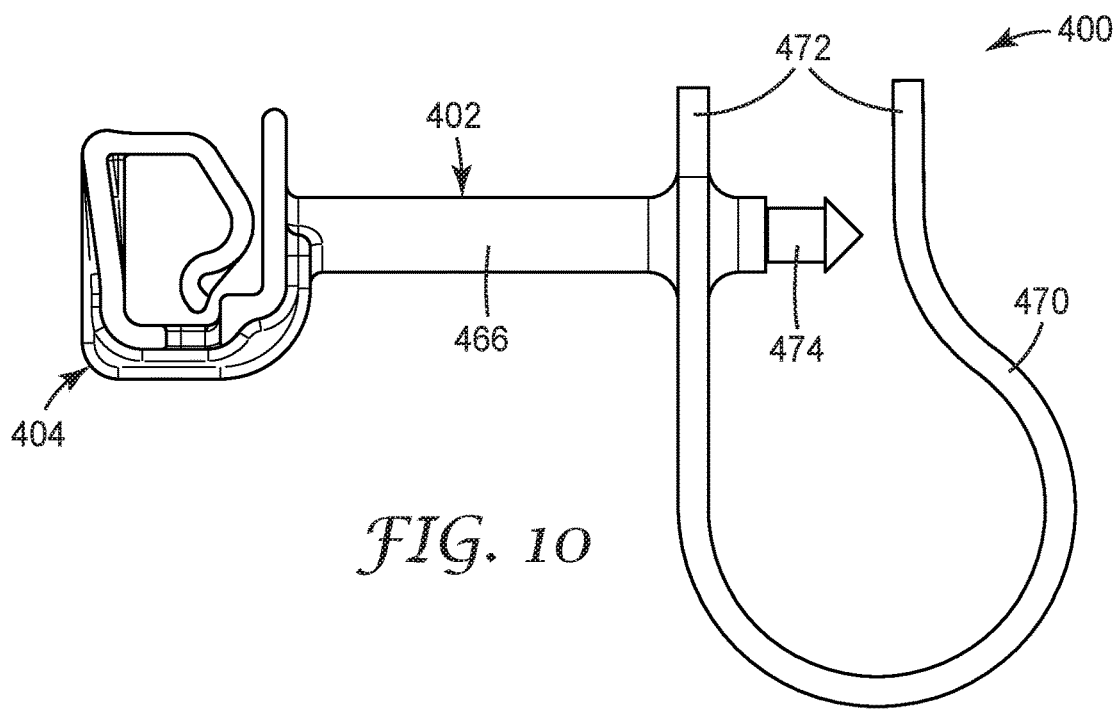
FIGS. 10-11 are side and isometric views of an attachment device according to yet another exemplary embodiment.
Figure 11:
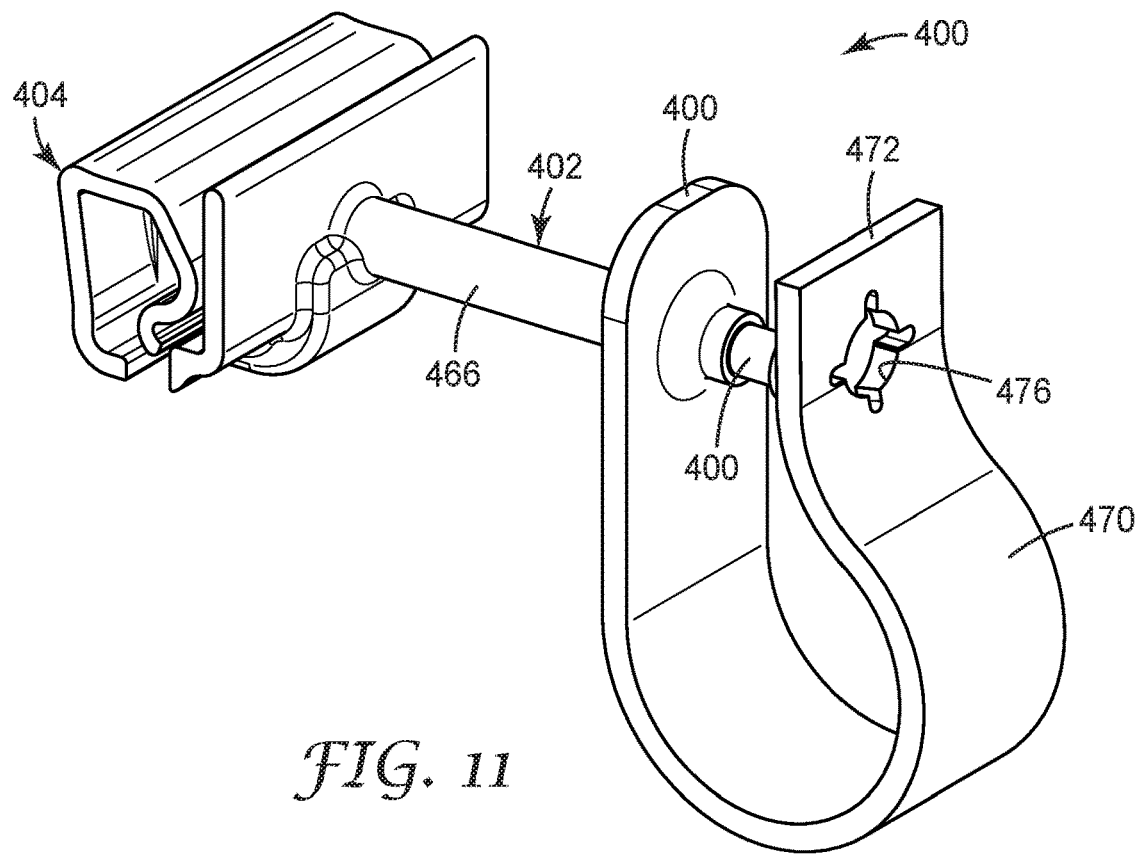

FIGS. 10-11 show still another attachment device 400 having a loop fastener 402 integrally coupled to a clip 404. The loop fastener 402 is comprised of a cylindrical body 466 extending outwardly from a first member of the clip 404. Connected to the opposite end of the cylindrical body 466 is a flexible band 470 having a generally "U"-shaped configuration. In this instance, the terminal ends 472 of the flexible band 470 can be releasably coupled to each other to form a closed loop. Closure is achieved in this case by inserting a barbed post 474, permanently mounted to one of the terminal ends 472, through a mating receptacle 476 on the opposing terminal end 472.

Figure 12:
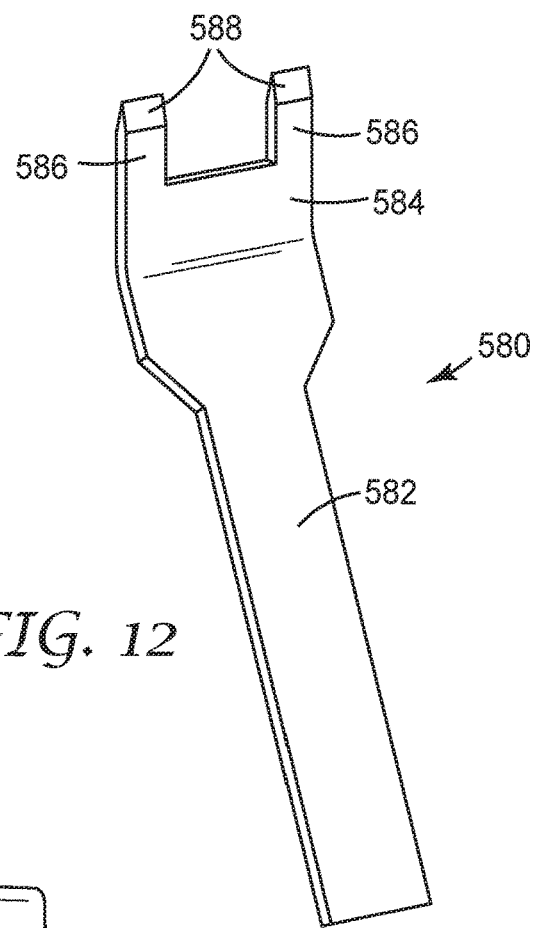
FIG. 12 is an isometric view of an exemplary tool for use with the aforementioned attachment devices.

FIG. 12 shows an optional prying tool 580 that can be used to facilitate disengagement of an attachment device coupled to a rail. It is noteworthy that when the attachment device and rail are rigidly coupled to each other, the attachment device may be subjected to ordinary forces in use. For example, such forces may come from dead load weight, swaying motions resulting from acceleration or deceleration of the attached structure, vibrations, and even bumping and jostling around the time of installation. Here, the attachment device 100 and tool 580 operate in a manner that advantageously resists accidental disengagement and yet provides for easy release "on demand."

As shown in FIG. 12 the tool 580 is generally flat and comprised of a handle 582 coupled to a head portion 584 that in turn has a pair of spaced-apart prongs 586. The prongs 586 have a rectangular cross-section and terminate in tapered ends 588. Optionally and as shown, the head portion 584 is angled slightly relative to the handle 582 to provide added clearance for the hand of operator, which can be helpful when working near a wall.

Figure 13:
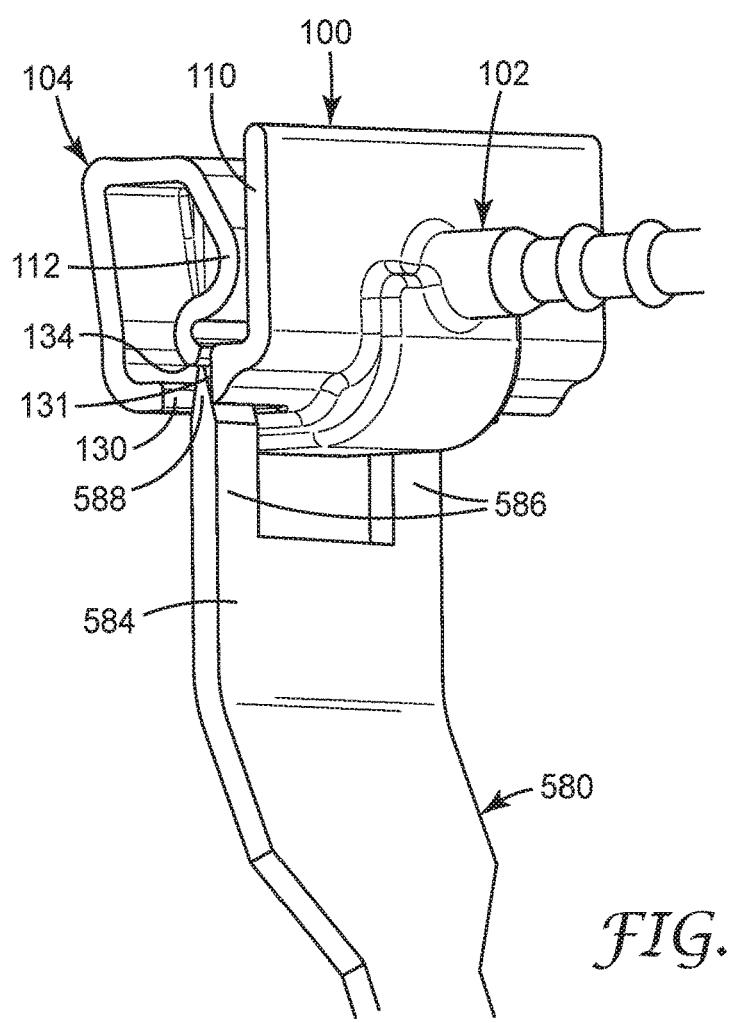
FIG. 13 is a fragmentary isometric view of the tool of FIG. 12 engaged to the attachment device of FIGS. 1-4.

FIG. 13 shows the manner of engagement between the tool 580 and the attachment device 100. As shown, the tapered ends 588 of the prongs 586 are inserted through both openings 130 to contact the distal ends 134 of the second member 112 within the longitudinal cavities 136. From this position, pivoting the handle of the tool 580 about respective peripheral edges 131 of the openings 130 causes each distal end 134 of the second member 112 to resiliently deflect in response to a reciprocal force applied by the tool 580 to the peripheral edges 131. Such deflection of the distal ends 134 widens the gap 120 between the first and second members 110, 112 to unlock the interference fit between the clip 104 and the rail (not shown in FIG. 13) and allow the attachment device 100 to be slidably removed from the gap 120 and disengaged from the rail.

Engaging both openings 130 with the prongs 586 can provide some degree of time savings since both the left and right sides of the clip 104 can be disengaged from the rail simultaneously. Notwithstanding the above, it is also possible to engage one side at a time using a non-specialized tool such as a flat-headed screwdriver to pry apart the first and second members 110, 112 and release the clip 104 in a similar manner. If a single pronged tool such as a screwdriver is used, it may be convenient to pry open the gap 120 by twisting the tool along its long axis.

While not intended to be exhaustive, further illustrative embodiments are enumerated as follows:

1. An attachment device for a rail comprising: a fastener; a clip coupled to the fastener, the clip comprising: first and second members having respective first and second engagement surfaces that oppose each other and define a gap sized to receive a portion of the rail; and a bridging member connecting the first and second members to each other, the bridging member having at least one opening aligned with the gap and providing access for a prying tool to resiliently deflect the first and/or second engagement surface and facilitate detachment of the clip from the rail.
2. The attachment device of embodiment 1, wherein the fastener comprises a spike with locking barbs.
3. The attachment device of embodiment 1, wherein the fastener comprises a loop fastener.
4. The attachment device of embodiment 3, wherein the loop fastener is reclosable.
5. The attachment device of embodiment 1, wherein the fastener comprises a receptacle.
6. The attachment device of any one of embodiments 1-5, wherein the gap is an elongated gap.
7. The attachment device of embodiment 6, wherein the elongated gap has an aspect ratio of from 100:1 to 10:1.
8. The attachment device of embodiment 7, wherein the elongated gap has an aspect ratio of from 80:1 to 20:1.
9. The attachment device of embodiment 8, wherein the elongated gap has an aspect ratio of from 60:1 to 30:1.
10. The attachment device of any one of embodiments 1-9, wherein the first and second members and bridging member are part of a unitary member.
11. The attachment device of embodiment 10, wherein the unitary member comprises a polymer.
12. The attachment device of embodiment 11, wherein the polymer is selected from the group consisting of: polystyrene, polypropylene, polyethylene, acrylonitrile butadiene styrene, nylon, polyamide, polybutylene terephthalate, polycarbonate, polyoxymethylene, polyethylene terephthalate, polyphenylene sulfide, polyphenylene oxide, polysulphone, polytetrafluoroethylene, and mixtures and copolymers thereof.
13. The attachment device of any one of embodiments 1-12, wherein the at least one opening comprises a pair of openings, each aligned with the gap.
14. The attachment device of any one of embodiments 1-13, wherein each opening extends inwards from a lateral edge of the bridging member.
15. The attachment device of any one of embodiments 1-14, wherein the first engagement surface is generally planar.
16. The attachment device of any one of embodiments 1-15, wherein the second engagement surface is generally convex.
17. The attachment device of any one of embodiments 1-16, wherein the first member, bridging member, and second member are arranged in a bi-folded, overlapping relation whereby the second member is disposed between the first member and the bridging member as viewed from a transverse direction.
18. The attachment device of any one of embodiments 1-17, wherein the bridging member has a generally "U"-shaped configuration.
19. The attachment device of any one of embodiments 1-18, wherein the second member has a distal end terminating at a location adjacent to each opening as viewed from a transverse direction.
20. The attachment device of any one of embodiments 1-19, wherein at least portions of the first and second engagement surfaces generally parallel with each other.
21. The attachment device of any one of embodiments 1-20, wherein the bridging member has a third engagement surface for engaging an inner surface of the rail.
22. The attachment device of embodiment 21, wherein at least portion of the third engagement surface is generally orthogonal to the first engagement surface.
23. The attachment device of embodiment 21 or 22, wherein the third engagement surface is generally planar.
24. The attachment device of embodiment 23, wherein the third engagement surface extends a distance D1 from the plane of the first engagement surface, the first engagement surface has an overall height H defined perpendicular to a longitudinal axis of the gap, and ratio D1/H is in the range of from 0.7 to 2.
25. The attachment device of embodiment 24, wherein the ratio D1/H is in the range of from 0.9 to 1.8.
26. The attachment device of embodiment 25, wherein the ratio D1/H is in the range of from 1 to 1.5.
27. An attachment device for a rail comprising: a fastener; a clip coupled to the fastener, the clip comprising: first and second members having respective first and second engagement surfaces that oppose each other and define a gap sized to receive a portion of the rail, the first engagement surface being generally planar and having a height H defined perpendicular to a longitudinal axis of the gap; and a bridging member connecting the first and second members to each other, the bridging member having a third engagement surface extending a distance D1 from the plane of the first engagement surface, and ratio D1/H is in the range of from 0.7 to 2.
28. The attachment device of embodiment 27, wherein the ratio D1/H is in the range of from 0.9 to 1.8.
29. The attachment device of embodiment 28, wherein the ratio D1/H is in the range of from 1 to 1.5.
30. The attachment device of any one of embodiments 27-29, wherein the second engagement surface including a longitudinal cavity shaped to receive a tip of the prying tool.
31. An attachment device for a rail comprising: a fastener; a clip coupled to the fastener, the clip comprising: first and second members having respective first and second engagement surfaces that oppose each other and define a gap sized to receive a portion of the rail, the second member including a longitudinal cavity shaped to receive a tip of a prying tool; and a bridging member connecting the first and second members to each other.
32. A coupled assembly comprising the attachment device of any one of embodiments 1-31 with the rail mechanically retained in the attachment device.
33. A method of coupling the attachment device of any one of embodiments 1-31 to the rail, the method comprising: aligning an edge of the rail with the gap; and urging the edge of the rail into the gap until the first and second members mutually engage opposing sides of the rail to mechanically retain the portion of the rail within the gap.

34. A method of releasing the attachment device of any one of embodiments 1-31 from the rail, the method comprising: inserting a prying tool through the opening; applying a force against the first or second member to resiliently deflect the first and/or second member apart from each other; and slidably removing the portion of the rail through the widened gap.

35. A method of releasing an attachment device from a rail, wherein the attachment device comprises a clip having first and second members engaged to opposing surfaces of the rail and a bridging member connecting the first and second members to each other, the method comprising: inserting a prying tool through an opening in the bridging member to access the first or second member; with the prying tool, resiliently deflecting the first and/or second member apart from each other; and slidably disengaging the rail from the first and second members.

36. The method of embodiment 34 or 35, wherein resiliently deflecting the first and/or second member comprises resiliently deflecting the second member.

37. The method of embodiment 36, wherein resiliently deflecting the second member comprises resiliently deflecting a distal end of the second member.

38. The method of embodiment 37, wherein resiliently deflecting a distal end of the second member comprises applying a force to the distal end of the second member, with a reciprocal force applied to a peripheral edge of the opening.

39. The method of embodiment 38, wherein applying force to the distal end of the second member comprises pivoting the prying tool about the peripheral edge of the opening.

40. The method of any one of embodiments 33-39, wherein the rail is part of an aircraft stringer.

41. The method of any one of embodiments 33-40, wherein the rail has a generally "L"-shaped cross-section.

42. The method of any one of embodiments 33-41, wherein the clip can be mechanically retained to the rail by an interference fit.

43. The method of any one of embodiments 33-42, wherein the second member and bridging member can engage adjacent, orthogonal surfaces of the rail.

44. The method of embodiment 43, wherein the second engagement surface contacts two discrete locations along the rail.

45. The method of embodiment 44, wherein the two discrete locations are on a return flange and rear-facing side of the rail.

46. The method of embodiment 45, wherein the return flange is orthogonal to the rear-facing side of the rail.

47. The method of any one of embodiments 33-46, wherein the second member includes a longitudinal cavity shaped to receive a tip of the prying tool.

48. The method of any one of embodiments 33-47, wherein the attachment device can be rigidly coupled to the rail relative to 5 out of 6 degrees of freedom.

49. The method of any one of embodiments 33-48, wherein the bridging member has a third engagement surface for engaging an inner surface of the rail, the rail is attached to a wall that is spaced a distance D2 from the first engagement surface and further wherein ratio D1/D2 is in the range of from 0.5 to 1.

50. The method of embodiment 49, wherein the ratio D1/D2 is in the range of from 0.6 to 1.

51. The method of embodiment 50, wherein the ratio D1/D2 is in the range of from 0.7 to 1.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of coupling an attachment device to a rail, the method comprising:
    providing an attachment device comprising:
        a fastener; and
        a clip coupled to the fastener, the clip comprising:
            first and second members having respective first and second engagement surfaces that diametrically oppose each other and define a gap sized to receive a portion of the rail, the first engagement surface being generally planar and having a height H defined perpendicular to a longitudinal axis of the gap; and
            a bridging member connecting the first and second members to each other, the bridging member having a third engagement surface for engaging an inner surface of the rail and presented on an outward-facing surface of the clip, the third engagement surface being separated from a plane of the first engagement surface by a distance D1, and ratio D1/H is in the range of from 0.7 to 2;
    aligning an edge of the rail with the gap; and
    urging the edge of the rail into the gap until the first and second members mutually engage opposing sides of the rail to mechanically retain the portion of the rail within the gap.

2. The method of claim 1, wherein the rail has a generally "L"-shaped cross-section.

3. The method of claim 1, wherein the second engagement surface includes a convex contour.

4. The method of claim 1, wherein the first member, bridging member, and second member are arranged in a bi-folded, overlapping relation whereby the second member is disposed between the first member and the bridging member as viewed from a transverse direction.

5. The method of claim 1, wherein at least a portion of the third engagement surface is generally orthogonal to the first engagement surface.

6. The method of claim 1, wherein the third engagement surface is a protruding surface.

7. The method of claim 1, wherein the distal end of the second member provides a fourth engagement surface for engaging a distal end of the rail.

8. A method of releasing an attachment device from a rail, the method comprising:
    providing an attachment device comprising:
        a fastener; and
        a clip coupled to the fastener, the clip comprising:
            first and second members having respective first and second engagement surfaces that diametrically oppose each other and define a gap sized to receive a portion of the rail; and
            a bridging member connecting the first and second members to each other, the bridging member having a pair of openings, each aligned with the gap and extending inwards from a lateral edge of the bridging member adjacent to a distal end of the second member, thereby providing access for a prying tool to resiliently deflect the distal end of the second member away from the first member to facilitate detachment of the clip from the rail;

wherein the bridging member has a third engagement surface for engaging an inner surface of the rail; and further wherein the second member is disposed between the first member and the bridging member as viewed from a transverse direction;

inserting a prying tool through either opening;

applying a force against the first or second member to resiliently deflect the first and/or second member apart from each other to provide a widened gap; and slidably removing the portion of the rail through the widened gap.

9. The method of claim 8, wherein the rail has a generally "L"-shaped cross-section.

10. The method of claim 8, wherein the first engagement surface is generally planar.

11. The method of claim 8, wherein the second engagement surface includes a convex contour.

12. The method of claim 8, wherein the first member, bridging member, and second member are arranged in a bi-folded, overlapping relation whereby the second member is disposed between the first member and the bridging member as viewed from a transverse direction.

13. The method of claim 8, wherein the distal end of the second member terminates at a location adjacent the pair of openings as viewed from a transverse direction.

14. The method of claim 8, wherein the third engagement surface is separated from a plane of the first engagement surface by a distance D1, the first engagement surface has an overall height H defined perpendicular to a longitudinal axis of the gap, and ratio D1/H is in the range of from 0.7 to 2.

* * * * *